(No Model.)
J. P. SMITH.
BUTTER AND CHEESE KNIFE.
No. 331,915. Patented Dec. 8, 1885.
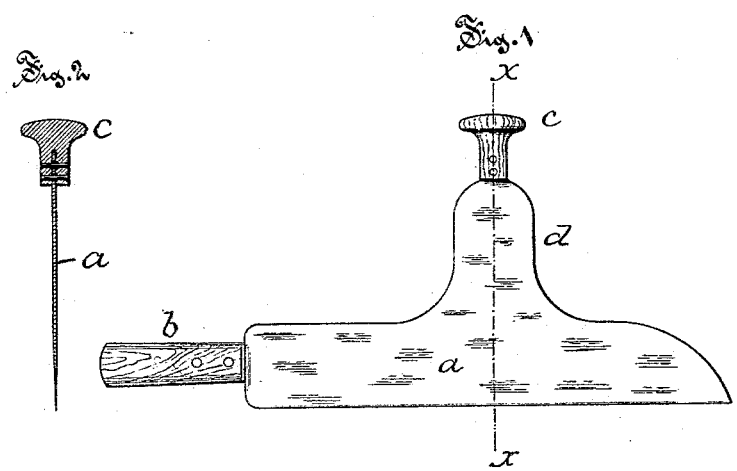
Witnesses
W. M. Bjoerkman
Walter H. Dunce
Inventor
Joseph P. Smith
by Simonds & Burdett,
Atty's.

UNITED STATES PATENT OFFICE.

JOSEPH P. SMITH, OF GLASTONBURY, CONNECTICUT.

BUTTER AND CHEESE KNIFE.

SPECIFICATION forming part of Letters Patent No. 331,915, dated December 8, 1885.

Application filed October 8, 1884. Serial No. 144,967. (No model.)

*To all whom it may concern:*

Be it known that I, JOSEPH P. SMITH, of Glastonbury, in the county of Hartford and State of Connecticut, have invented a certain new and useful Improvement in Butter and Cheese Knives, of which the following is a description, reference being had to the accompanying drawings, wherein—

Figure 1 is a side view of a knife embodying my improvement. Fig. 2 is a view in cross-section of same on plane denoted by line *x x* of Fig. 1.

The object of my invention is to provide a knife that shall be particularly adapted to cutting such articles as cheese and butter, my improved knife being so constructed that pressure may be applied at more than one part of the blade in cutting.

My invention consists of a knife having the usual handle at the end of the blade, and also a supplemental handle attached to the back of the blade, that is widened at that part in the plane of the blade, and of substantially the same thickness as the blade.

In the accompanying drawings, the letter *a* denotes the blade of the knife, that is made of the usual material, as steel; *b*, a handle that is fastened to a tang or narrowed part of the blade at one end in the usual manner; *c*, a supplemental handle that is fastened to the part *d*, that is integral with the blade and extends from its back in the plane of the blade, or this handle *c* is secured to a frame. The special office and use of this additional handle *c* on the back of the blade is to furnish means for applying pressure to the blade at a part near its point, so that the latter may be forced through the material being cut with much greater ease and rapidity than is possible where a long-bladed knife with but the ordinary handle is used; and the part *d* is made of a sufficient length to allow the blade to be forced completely through the material being cut—in the case of a cheese usually about eight inches.

Such a knife finds its widest utility in cutting cheeses, and it is made particularly for such use; but as it may be used for cutting many other substances I do not limit myself to any particular use. The blade is preferably stamped by means of dies from a sheet of steel and a blank formed with the tang and projections integral with the blade proper; but the particular form of the blade or location on it of the supplemental handle is not essential. The blade may be solid, as shown in Fig. 1, or cut away at any part within its outline to save metal, where such removal of metal will not interfere with its strength or utility.

I am aware that it is not new to provide a knife with a supplemental brace or handle removably secured thereto, as disclosed in United States Patent No. 230,393, of July 27, 1880, and that knives having handles on integral projections from their shanks are not new, such being shown in United States Patents Nos. 112,400, 226,146, 297,753, and 288,198; and I do not claim such devices.

I claim as my invention—

As an improved article of manufacture, a butter or cheese knife having a blade formed of a single piece of plate metal, with an integral projection from the back of and in the plane of the blade proper, said projection being of substantially the same thickness as the blade, and having a handle at one end of the blade in the usual position, and a supplemental handle on the integral projection, all substantially as described.

JOSEPH P. SMITH.

Witnesses:
CHAS. L. BURDETT,
W. H. MARSH.